United States Patent
Marcus et al.

(10) Patent No.: US 8,937,766 B2
(45) Date of Patent: *Jan. 20, 2015

(54) STEREOSCOPIC DISPLAY USING MULTI-LINEAR ELECTROMECHANICAL MODULATOR

(75) Inventors: Michael A. Marcus, Honeoye Falls, NY (US); John A. Agostinelli, Rochester, NY (US); Marek W. Kowarz, Henrietta, NY (US)

(73) Assignee: Eastman Kodak Company, Rochester, NY (US)

( * ) Notice: Subject to any disclaimer, the term of this patent is extended or adjusted under 35 U.S.C. 154(b) by 759 days.

This patent is subject to a terminal disclaimer.

(21) Appl. No.: 12/047,605

(22) Filed: Mar. 13, 2008

(65) Prior Publication Data

US 2009/0231697 A1    Sep. 17, 2009

(51) Int. Cl.
- *G02B 27/22* (2006.01)
- *H04N 13/04* (2006.01)
- *H04N 3/10* (2006.01)

(52) U.S. Cl.
CPC .............. *H04N 3/10* (2013.01); *G02B 27/2214* (2013.01); *G02B 27/2228* (2013.01); *H04N 13/0459* (2013.01)
USPC ........... 359/466; 359/462; 359/464; 359/465; 359/298; 348/54

(58) Field of Classification Search
USPC .......... 359/462, 464, 465, 298, 466; 353/7, 8; 348/54
See application file for complete search history.

(56) References Cited

U.S. PATENT DOCUMENTS

| | | | |
|---|---|---|---|
| 5,920,361 A | 7/1999 | Gibeau et al. | |
| 6,215,579 B1 | 4/2001 | Bloom et al. | |
| 6,307,663 B1 | 10/2001 | Kowarz | |
| 6,411,425 B1 | 6/2002 | Kowarz et al. | |
| 6,535,241 B1 | 3/2003 | McDowall et al. | |
| 6,663,788 B2 | 12/2003 | Kowarz | |
| 6,779,892 B2 * | 8/2004 | Agostinelli et al. | 353/7 |
| 6,802,613 B2 | 10/2004 | Agostinelli et al. | |
| 6,829,089 B2 * | 12/2004 | Agostinelli et al. | 359/466 |
| 7,001,021 B2 | 2/2006 | Jorke | |
| 7,180,554 B2 | 2/2007 | Divelbiss et al. | |
| 7,204,592 B2 | 4/2007 | O'Donnell et al. | |
| 7,274,500 B2 | 9/2007 | Kowarz | |
| 7,375,885 B2 * | 5/2008 | Ijzerman et al. | 359/462 |
| 7,411,722 B2 * | 8/2008 | Kowarz | 359/298 |
| 8,134,591 B2 * | 3/2012 | Marcus et al. | 348/54 |
| 2007/0047061 A1 * | 3/2007 | Kowarz | 359/291 |
| 2008/0036854 A1 | 2/2008 | Elliott et al. | |
| 2008/0158672 A1 * | 7/2008 | McCosky | 359/464 |
| 2009/0168164 A1 | 7/2009 | Kean et al. | |
| 2010/0066816 A1 | 3/2010 | Kane et al. | |

FOREIGN PATENT DOCUMENTS

| | | |
|---|---|---|
| EP | 0 211 596 A2 | 2/1987 |
| EP | 0 712 109 A1 | 5/1996 |

* cited by examiner

*Primary Examiner* — Audrey Y Chang
(74) *Attorney, Agent, or Firm* — Nelson Adrian Blish

(57) ABSTRACT

A method for forming a stereoscopic image having a left-eye image and a right-eye image repeats the steps of directing a line of the left-eye image as incident light toward a scanning element while directing a line of the right-eye image as incident light toward the scanning element, and moving the scanning element into position for directing incident light toward a portion of a display surface.

14 Claims, 15 Drawing Sheets

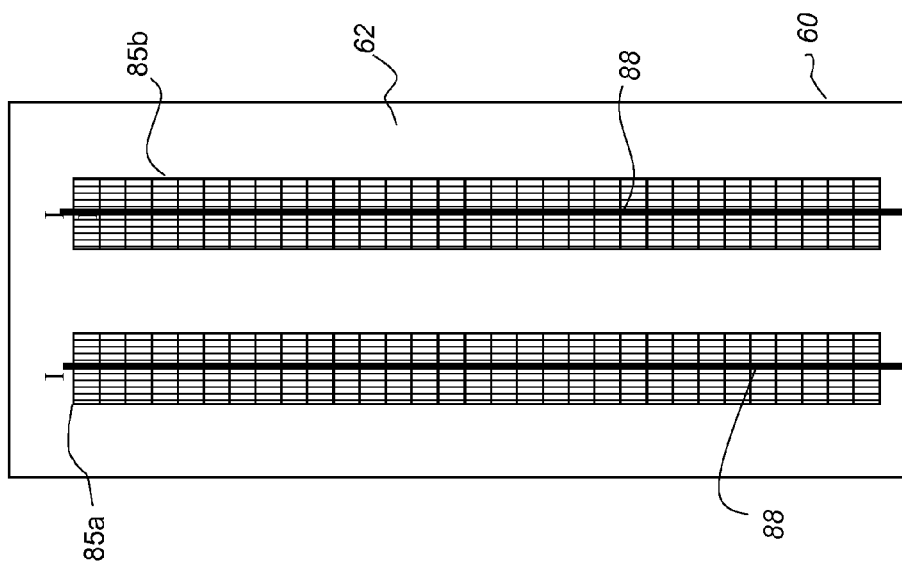

STEREOSCOPIC DISPLAY USING MULTI-LINEAR ELECTROMECHANICAL MODULATOR

FIELD OF THE INVENTION

This invention generally relates to display apparatus and more particularly relates to a display apparatus using an arrangement of bilinear and trilinear electromechanical grating devices.

BACKGROUND OF THE INVENTION

With continuing improvements in cost and performance, solid-state lasers have potential benefits as illumination components for display systems. Their inherent spectral purity, high brightness, and long operating life have sparked particular interest among designers of high-end color projection systems for digital cinema, simulation, and other high-performance imaging apparatus. However, proposed solutions for using laser light sources for digital projection fall short of what is needed for providing robust display apparatus that take advantage of this potential.

Stereoscopic projection has been one area of particular interest for cinema projection overall. Conventional configurations for stereo projection include configurations that use two projectors, one for the left eye and the other for the right eye. This basic model has been applied with earlier film-based systems as well as with digital projection equipment, from vendors such as Barco Corporation. Although such two-projector designs have successfully shown the feasibility and enhanced imaging capabilities afforded by stereoscopic imaging systems, these systems are expensive, require precision alignment to each other, and impose some additional requirements on theater design and layout.

Various types of solutions for stereoscopic projection have been presented for digital projector apparatus, including configurations that use only a single projector. These have typically included systems utilizing either of two types of spatial light modulators (SLMs). The first type of spatial light modulator used in proposed stereoscopic designs is the digital light processor (DLP), a digital micromirror device (DMD), developed by Texas Instruments, Inc., Dallas, Tex. The second type of SLM widely used for digital projection is based on liquid crystal technology, available both as a transmissive light modulator, the liquid crystal device (LCD), and as a reflective liquid crystal on silicon (LCOS) modulator.

With any type of stereoscopic projection system, some type of separation mechanism is needed in order to distinguish the left and right images that are combined on a common display screen, but are intended for the appropriate left and right eyes of the viewers. Left- and right-eye images can be separated in time, can be of different polarizations relatively orthogonal to each other, or can be of different wavelengths. Conventional two-projector systems can use any of these separation schemes as just described. Single-projector digital systems can also use any of these methods. However, because they must direct light from the same projection lens, single-projector systems inherently tend to be less efficient.

Time-sequencing systems use a "page flipping" technique. Page-flipping alternately displays left- and right-eye images to provide stereo images to one or more viewers wearing shutter glasses that are synchronized to the display refresh rates. One example of this type of display system adapted for presenting stereoscopic images to multiple viewers is given in U.S. Pat. No. 6,535,241 (McDowall et al.).

Stereoscopic systems using polarization differences provide the left- and right-eye images using light at respectively orthogonal polarizations. Viewers are provided with polarized glasses to separate these left- and right-eye images. One example of this type of display system using linearly polarized light is given in U.S. Pat. No. 7,204,592 (O'Donnell et al.). A stereoscopic display apparatus using left- and right-circular polarization is described in U.S. Pat. No. 7,180,554 (Divelbiss et al.).

Stereoscopic systems can separate left- and right-eye images by wavelength and provide viewers with filter glasses that are suitably designed to distinguish the appropriate image for each eye. One example of this type of spectral separation display system is given in U.S. Pat. No. 7,001,021 (Jorke).

While each of these approaches provides workable stereoscopic display solutions to at least some degree, there are some significant problems that remain. Shutter glasses can be relatively expensive, require on-board battery power, and require synchronization with the projection system. Light utilization and efficiency is disappointing with all of these solutions. Stereoscopic systems using polarization use less than half of the available light available at any one time. Solutions using spectral separation require twice as many effective light sources as other systems and provide reduced color gamut as a result. Embodiments of each of these types of systems require high refresh rates in order to avoid flicker and can exercise the spatial light modulators at the upper limits of their practical refresh rates. Although they are advantaged over other types of light sources with regard to relative spectral purity and potentially high brightness levels, solid-state light sources require different approaches in order to use these advantages effectively.

Another type of light modulator solution for digital projection uses a linear light modulator that uses a one-dimensional array of n micro-devices and forms a two dimensional image by forming m successive single-line images, each single-line image extending in a first direction, and then scanning these m successive line images in a direction orthogonal to the first direction in order to project an image of m×n pixels.

Among linear light modulators are grating light valve (GLV) designs, offered by Silicon Light Machines, as described in U.S. Pat. No. 6,215,579 (Bloom et al.), and others. Still other solutions have been proposed using grating electro-mechanical systems (GEMS) devices, such as those disclosed in commonly-assigned U.S. Pat. No. 6,802,613 (Agostinelli et al.).

Both GLV and GEMS devices are well-suited to projection using laser devices. However, for a number of reasons, these devices have not as yet been advanced as candidates for stereoscopic projection. With these devices, shutter-glass or page-flipping stereo separation can be used, but there is still disappointing light utilization with this technique. Stereoscopic arrangements using polarization or spectral separation can be used, but thus far have required relatively complex optical designs, requiring high parts count and fairly difficult alignment challenges. With any of these approaches, attempts to increase light efficiency have also resulted in increased system complexity and cost.

Thus far, interest in stereoscopic image projection has been directed to area spatial light modulators such as DLP (DMD) or LCD devices. There is, then, a need for digital projection solutions that take advantage of the inherent light efficiency and high resolution of GEMS and other grating electro-mechanical light modulator devices for use in stereoscopic image projection.

SUMMARY OF THE INVENTION

It is an object of the present invention to address the need for improved stereoscopic projection apparatus. With this object in mind, the present invention provides a method for forming a stereoscopic image that comprises a left-eye image and a right-eye image, the method comprising the repeated steps of:

directing a line of the left-eye image as incident light toward a scanning element while directing a line of the right-eye image as incident light toward the scanning element; and moving the scanning element into position for directing incident light toward a portion of a display surface.

It is a feature of the present invention that it provides methods for stereoscopic projection using multi-linear GEMS spatial light modulators for improved brightness, resolution, and light utilization.

It is an advantage of the present invention that it provides stereoscopic projection approaches using three or more solid-state light sources with reduced complexity and reduced optical alignment requirements over conventional designs.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

FIG. 1A is a plan view of a bilinear GEMS chip;

DETAILED DESCRIPTION OF THE INVENTION

Figure 1B:
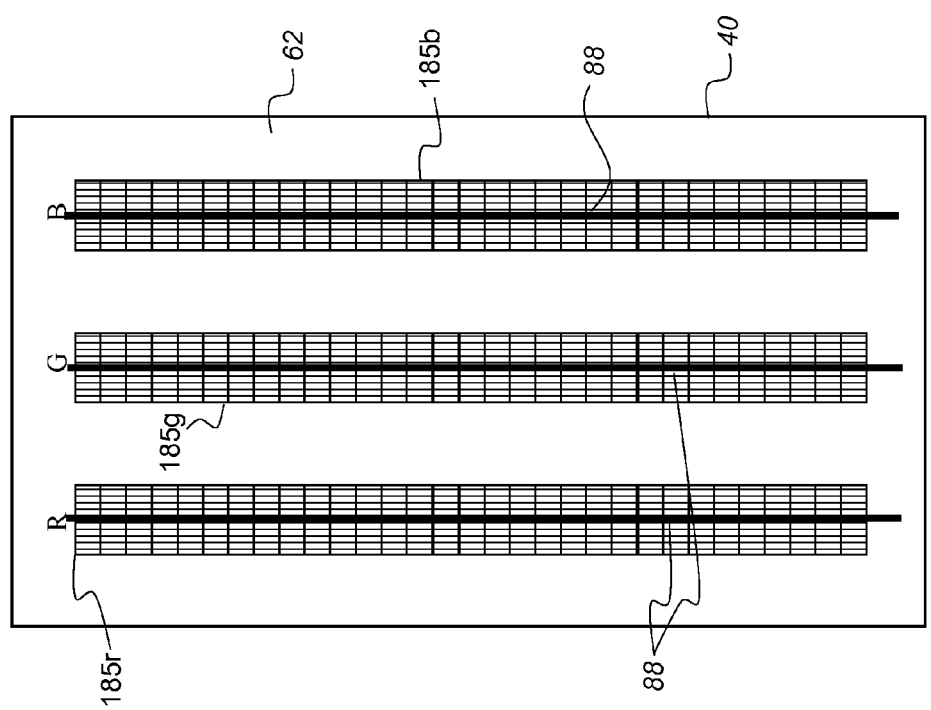
FIG. 1B is a plan view of a trilinear GEMS chip.

The present description is directed in particular to elements forming part of, or cooperating more directly with, apparatus in accordance with the invention. It is to be understood that elements not specifically shown or described may take various forms well known to those skilled in the art. Figures shown and described herein are provided in order to illustrate key principles of operation of the present invention and are not drawn with intent to show actual size or scale. Some exaggeration may be necessary in order to emphasize relative spatial relationships or principles of operation.

In the following disclosure, the phrase "left-eye image" denotes the image formed by a display apparatus and intended for viewing by the left eye of the viewer. Likewise, the phrase "right-eye image" refers to the image that is intended for viewing from the right eye of the viewer.

In the context of the present invention, the term "spectral range" refers to a single wavelength or to a relatively narrow range of wavelengths of no more than about 40 nm. As described earlier in the background section, spectral stereo vision separation schemes project left- and right-eye images at different wavelengths for each primary color (red, green, or blue, conventionally referred to as R, G, or B) and use filter elements to separate the left- and right-eye image content for each color.

For image separation, embodiments of the present invention may use orthogonally polarized light as the distinguishing feature between left- and right-eye images. Polarization can be linear, elliptical, or circular, with the modulated light for the left eye orthogonally polarized with respect to the modulated light for the right eye.

Embodiments of the present invention use linear light modulator arrays such as multi-linear grating electro-mechanical systems (GEMS) devices to provide stereoscopic display apparatus that allow advantages such as improved use of laser light sources and increased brightness from a single projector, and using less complex optical designs than had been previously proposed. In the context of the present disclosure, the term "chip" is used as it is familiarly used by those skilled in the micro-electromechanical device arts. The term chip refers to the one-piece electromechanical circuit package that includes one or more linear light modulator arrays formed on a single substrate, such as the conformal grating devices described in detail in commonly-assigned U.S. Pat. No. 6,411,425 (Kowarz et al.). The GEMS chip not only includes the elongated ribbon elements that form the light-modulating grating for light reflection and diffraction, but may also include the underlying circuitry that applies the electrostatic force that is used to actuate these ribbon elements. In manufacture, the tiny electronic and mechanical components that form the chip, such as the GEMS chip shown in the Kowarz et al. '425 patent, are fabricated onto a single substrate. The chip package also includes signal leads for interconnection and mounting onto a circuit board or other suitable surface.

Further detailed description of GEMS device architecture and operation is given in a number of commonly assigned U.S. patents and published applications, including U.S. Pat. No. 6,307,663 (Kowarz), U.S. Pat. No. 6,663,788 (Kowarz et al.), and U.S. Pat. No. 6,802,613 (Agostinelli et al.). In GEMS devices, light is modulated by diffraction. On a GEMS chip, the linear array of conformal electromechanical ribbon elements, formed on a single substrate, provides one or more diffracted orders of light to form each line of pixels for line-scanned projection display.

Multi-linear GEMS chips are of particular interest as linear light modulator arrays for stereoscopic embodiments described herein. Bilinear GEMS devices, as described in commonly-assigned U.S. Patent Application Publication No. 2007/0047061 (Kowarz), provide two separate electromechanical grating light modulator array sections, that is, two linear arrays of conformal electromechanical grating devices formed on a single substrate. FIG. 1A shows a bilinear GEMS chip 60 formed on a substrate 62 with two separate electromechanical grating light modulator array sections labeled 85a (I) and 85b (II). For reference, the relative position of incident linear illumination 88 is shown as it would be directed to each section. In this type of device, each of the two linear arrays of light modulating devices 85a and 85b that form sections I and II can be separately modulated. Typically, each of the light modulating devices on the linear arrays would have its own associated electronic driver channel.

Trilinear GEMS devices are described in U.S. Pat. No. 7,274,500 (Kowarz). FIG. 1B shows a trilinear GEMS chip 40 formed on substrate 62 and having three separate electromechanical grating light modulator array sections labeled 185r (R), 185g (G) and 185b (B). For reference, the relative position of incident linear illumination 88 is shown as it would be directed to each section. In this type of device, each of the three linear arrays of light modulating devices 185r, 185g, and 185b can be separately modulated. Typically, each of the light modulating devices on the linear arrays would have its own associated electronic driver channel.

The embodiments described subsequently use GEMS devices as an exemplary linear light modulator array. However, it should be noted that other types of linear light modulator array may be usable for stereoscopic presentation using the methods described herein.

Figure 2:
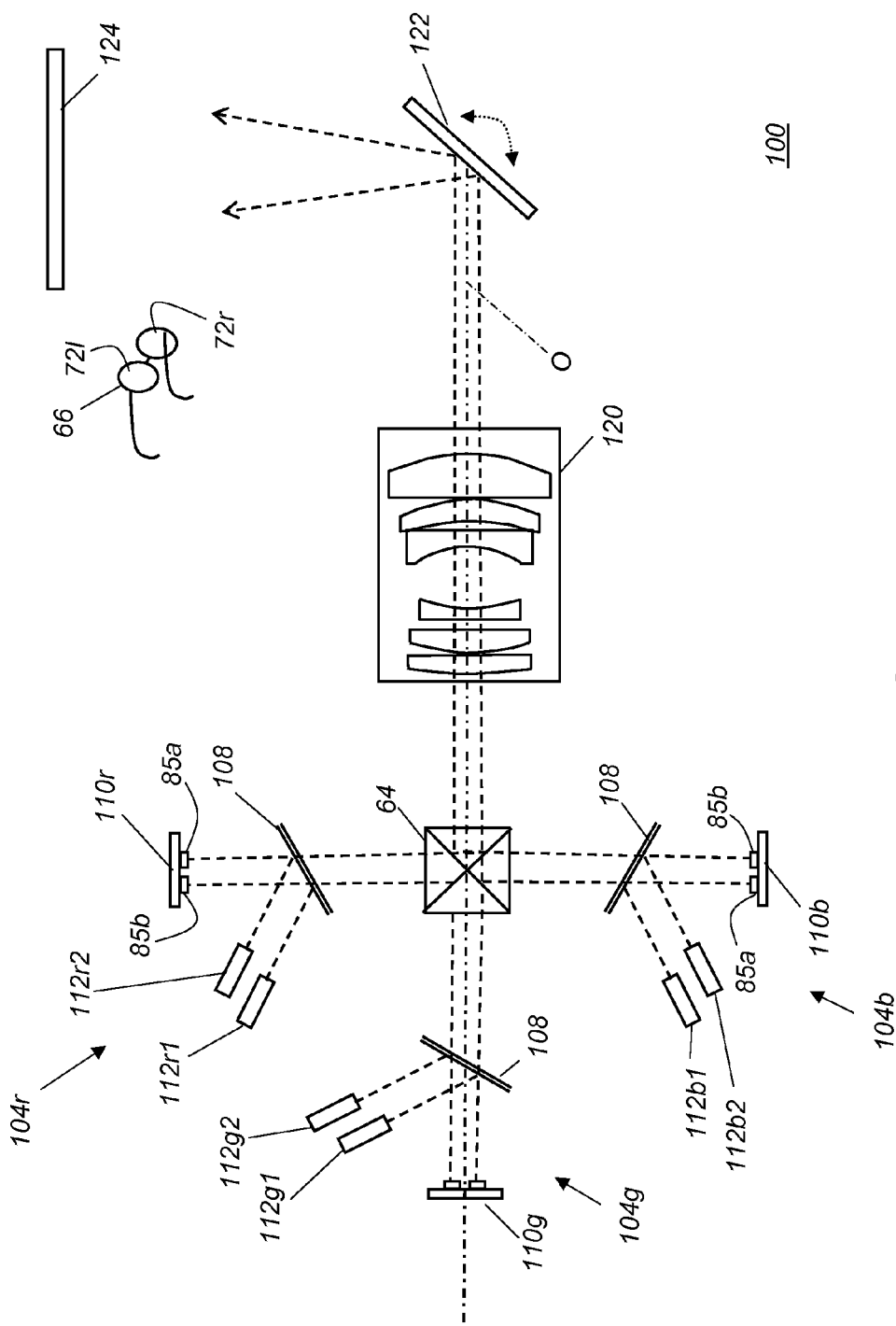
FIG. 2 is a schematic block diagram showing a stereoscopic display apparatus in one embodiment of the present invention.

Referring to FIG. 2, there is shown an embodiment of a polychromatic display apparatus 100 having three light modulation subsystems, shown as light modulation modules 104r, 104g, and 104b, each corresponding to a color channel. Each of modulation modules 104r, 104g, and 104b use bilinear GEMS spatial light modulator chips 110r, 110g, and 110b, respectively. Each bilinear GEMS spatial light modulator chip modulates light from two laser light sources, one for the left-eye image and one for the right-eye image. Referring back to the plan view of FIG. 1A, light from the first of the two laser light sources forms the linear illumination 88 incident on linear array 85a and light from the second of the two laser light sources forms the linear illumination 88 incident on linear array 85b. In the embodiment of FIG. 2, bilinear GEMS spatial light modulator chip 110r modulates incident linear illumination from red lasers 112r1 and 112r2. Bilinear GEMS spatial light modulator chip 110g modulates incident linear illumination from green lasers 112g1 and 112g2. Bilinear GEMS spatial light modulator chip 110b modulates incident linear illumination from blue lasers 112b1 and 112b2. It should be noted that linear arrays 85a and 85b are shown with exaggerated spatial separation in the schematic view of FIG. 2 in order to illustrate their function more clearly; in one embodiment, the actual distance between linear arrays 85a and 85b is on the order of 1 mm. Each of linear arrays 85a and 85b generates an image for each eye; thus, for example, where linear array 85a generates the left-eye image, linear array 85b generates the right-eye image.

There is a spatial filter 108, such as a patterned mirror having alternate reflective and transmissive sections, in each light modulation module 104r, 104g, and 104b. The reflective sections of spatial filter 108 direct illumination from each laser light source to its corresponding array of light modulator devices on the bilinear GEMS spatial light modulator chip. Transmissive sections of spatial filter 108 then transmit modulated light from the bilinear GEMS spatial light modulator toward a combiner 64. Unwanted zero-order reflected light from the bilinear GEMS spatial light modulator is also blocked by spatial filter 108.

The modulated light from each light modulation module 104r, 104g, and 104b are combined and directed along an optical path O by combiner 64, such as an X-cube, familiar to those skilled in the electronic projection arts and represented in FIG. 2. Projection optics 120 then direct the modulated light along optical path O toward a single scanning element 122, such as a scanning mirror or rotating prism or polygon or an apparatus having one or more coupled scanning mirrors which, in turn, directs the incident modulated lines of light for left- and right-eye images toward a display surface 124. To form the two-dimensional image, scanning element 122 is thus continuously re-positioned for directing incident light from each of the light modulation modules toward a portion of display surface 124. A decoding device is used for separating the left-eye image from the right-eye image. The embodiment of FIG. 2 shows glasses 66 as a decoding device. Glasses 66 of this type, worn by each viewer, are suitably equipped with left and right distinction elements 72l and 72r, such as filters or polarizers for separating right- and left-eye images. It should be noted that glasses 66 are one of a number of possible types of decoding devices that could be used for left- and right-eye separation.

For the FIG. 2 embodiment, each light modulation module 104r, 104g, and 104b has two light sources, one providing illumination for the left eye, the other providing illumination for the right eye. Considering one embodiment of light modulation module 104r as an example, polarization can be used to distinguish right- and left-eye images. Light source 112r1 has red light of a first polarization that is intended for the left eye. Light source 112r2 has red light of a second polarization, orthogonal with respect to the first polarization, and intended for the right eye. In another embodiment, illumination of orthogonal polarizations in one or more of the color channels originates from the same light source. A beamsplitter separates the original light beam into two beams; one is then directed through a polarizing-altering component, such as a waveplate, to provide orthogonal polarization.

Following modulation at GEMS spatial light modulator chip 110r, combiner 64 uses dichroic surfaces to redirect modulated red light of both polarizations along the optical axis O. Display surface 124 is a polarization-preserving display surface when polarization is used for left- and right-eye image differentiation. For a polarization-separation embodiment of this type, combiner 64 is substantially polarization-insensitive, providing substantially the same light transmission or reflection behavior for light of orthogonal polarization states.

Still referring to the schematic of FIG. 2, similar behavior applies where spectral difference, rather than polarization state difference, is used to distinguish left- and right-eye images. In one such example embodiment, where light modulation module 104r provides the red color channel, light sources 112r1 and 112r2 are nominally red, both within the same spectral range, that is, having wavelengths separated by no more than about 40 nm. In one embodiment, light source 112r1 has light of a first red wavelength (for example, 620 nm) that is intended for the left eye. Light source 112r2 emits light of a second red wavelength (for example, 640 nm) that is intended for the right eye. Green and blue channels are similarly arranged with light sources of different wavelengths. Filter glasses 66 are worn by the viewer and include filters as left and right distinction elements 72l and 72r that allow left- and right-eye images from a color channel to be separately viewable for stereo display.

Figure 3:
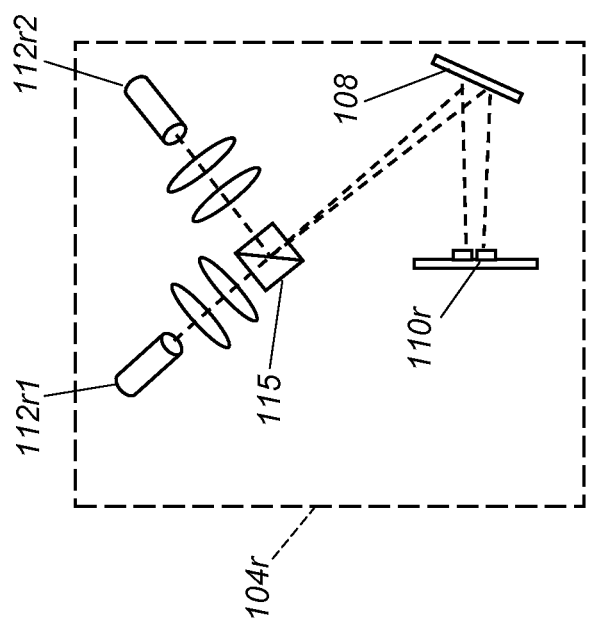
FIG. 3 is a schematic block diagram showing a combining beamsplitter in the illumination path.

There are a number of options for directing multiple light sources toward the same bilinear GEMS spatial light modulator chip 110r, 110g, or 110b. One method directs laser light sources from different sources arranged side-by-side, at slightly different angles, as is suggested by the embodiment represented in FIG. 2. The schematic block diagram of FIG. 3 shows another embodiment, used with components of one color channel, light modulation module 104r in this example. Here, a beamsplitter 115 combines light from light sources 112r1 and 112r2. Where light sources 112r1 and 112r2 differ by wavelength, beamsplitter 115 is a dichroic beamsplitter. Where light sources 112r1 and 112r2 differ by polarization state, beamsplitter 115 is a polarization beamsplitter.

The scanning sequence that is used for forming an image is familiar to those skilled in using linear light modulators. Additional details of the scan and column-timing operation for multi-linear arrays are disclosed in previously cited U.S. Patent Application Publication No. 2007/0047061, for example.

When forming a stereoscopic image of (n×m) pixels on display surface 124 with the embodiment shown in FIG. 2, each successive line of the left-eye image is directed, in turn, as incident light to scanning element 122 and from there onto display surface 124. Simultaneously each successive line of the right-eye image is similarly directed, in turn, toward scanning element 122 as incident light and, from there, onto display surface 124. Each line is n pixels in length. The complete left- or right-eye image is formed by scanning m successive lines onto display surface 124 from scanning element 122.

Scanning element 122 operates by continuously changing position, typically by rotation over some range of angles. Its angular position for directing incident light is tracked and is synchronized by control logic circuitry (not shown) that controls the timing with which data is delivered to bilinear GEMS spatial light modulator chips 110r, 110g, and 110b accordingly. As is exaggerated in FIG. 2 and in figures for embodiments shown subsequently, the two lines that are simultaneously projected for the left-eye image and right-eye image may not overlap on display surface 124 but may, instead, have some fixed offset distance between them. It can be appreciated by those skilled in the electronic imaging arts that this can also affect image content that is projected along extreme edges of the image on display surface 124. Thus, for example, the trailing edge of the scan (nearest the extreme end of scan travel) may include a few lines of image data that are for the left-eye image only. Likewise, the leading edge of the scan (nearest the beginning of scan travel) may include lines of image data that are for the right-eye image only. Over the substantial portion of the display area between these extreme edges, both left- and right-eye image content is projected. The unpaired lines at the edges of the image could be blanked if desired.

There are a number of observations of particular interest for the embodiments shown in FIG. 2 and in subsequent figures.

(i) Projection of left- and right-eye images from the same GEMS chip. While this is not true of a trilinear embodiment described subsequently, there are some advantages to this feature, particularly for accurate registration of left- and right-eye images on display surface 124.
  (ii) Simultaneous scanning of lines of light for left- and right-eye images. This sequence contrasts with other known single-projector stereoscopic imaging methods, such as "page flipping" that cyclically display a complete image for the left-eye and a complete image for the right-eye, as described in more detail subsequently. As described earlier, lines of light that are directed toward scanning element 122 at any particular instant in time may be overlapping or may be spatially offset from each other. For ease of description and understanding, figures in this disclosure show some offset distance between lines that are simultaneously projected for left- and right-eye images. Although left and right lines of modulated light may be projected simultaneously at some point in time, there may be some timing offset between the respective beginning and ending times for projection of each of the lines. Light of different colors may or may not overlap.
  (iii) Use of a single scanning element. With embodiments of the present invention, the same scanning element 122 is used to scan lines of both the left-eye image and right-eye image across display surface 124. Advantageously, the individual lines for left- and right-eye images can be simultaneously projected toward display surface 124 from scanning element 122.

The basic pattern shown in FIG. 2 admits a number of embodiments and modifications, including the use of combining dichroic or polarization surfaces that allow modulation of more than three colors or more than three spectral ranges, all within the scope of the present invention. In order to have a better grasp of the apparatus and methods of the present invention and its advantages, it is instructive to compare and contrast these with conventional stereoscopic techniques and practices used with single-projector digital projection apparatus.

Figure 4A:
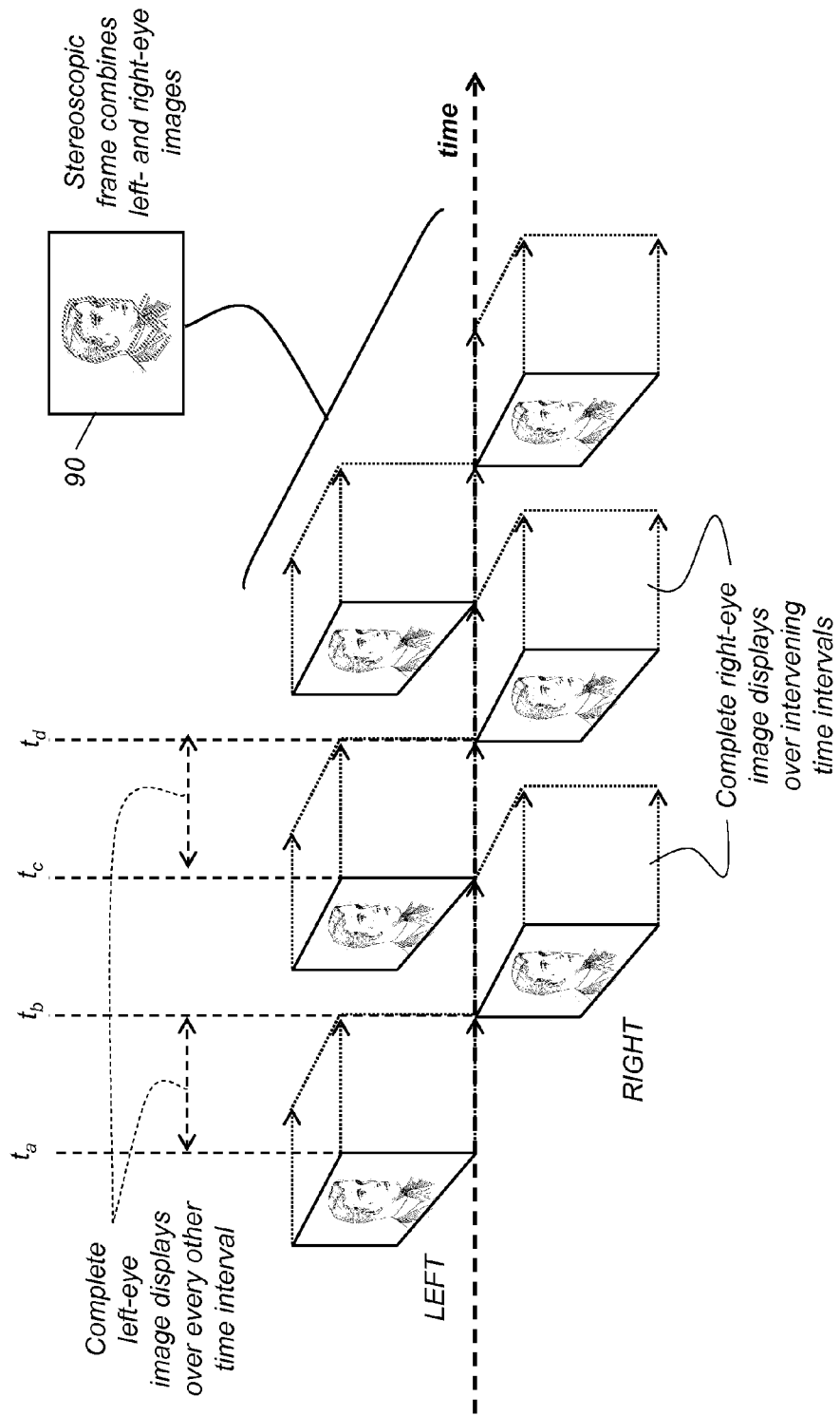
FIG. 4A is a timing diagram that shows a conventional timing sequence for stereoscopic display.
Figure 4B:
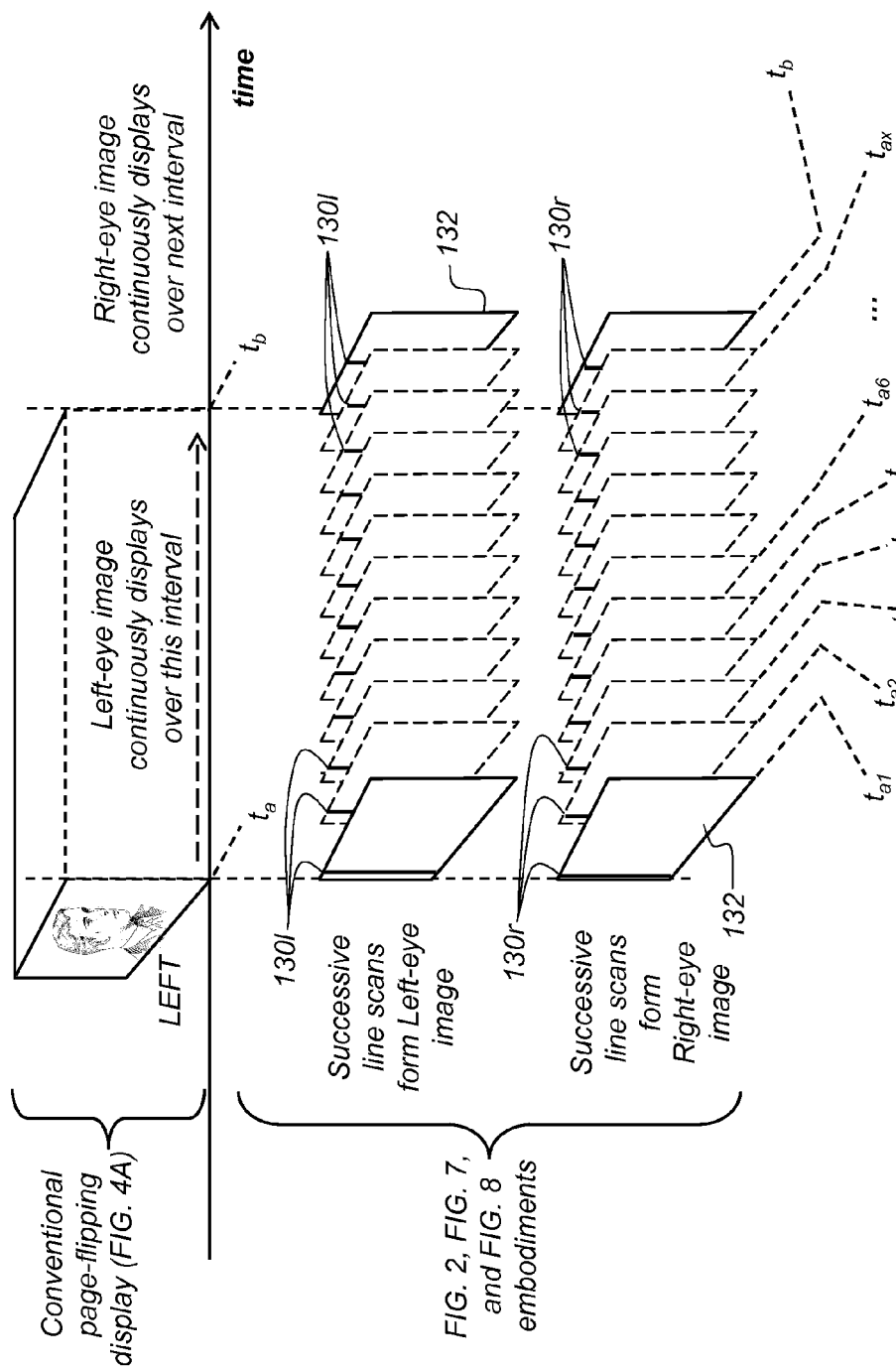
FIG. 4B is a timing diagram that contrasts stereoscopic image formation as practiced using the present invention with the conventional timing sequence.

FIGS. 4A and 4B are timing diagrams that compare the operation of a conventional stereoscopic imaging sequence with that provided by a multi-linear grating electromechanical system or other linear modulator array according to the present invention. For the discussion that follows, only one color is considered; bear in mind that three or more colors are usually employed for color image projection. The timing diagram of FIG. 4A shows a conventional sequence for stereoscopic display, known in the art as "page-flipping", in which the complete left- and right-eye images are alternately displayed. Their combination forms a stereoscopic frame 90. This example shows representative typical time intervals during which either the complete left-eye image or the complete right-eye image is displayed. For example, during the time interval that is between instants of time $t_a$ and $t_b$, only the left-eye image displays. Then, during the next time interval between times $t_b$ and $t_c$, only the right-eye image displays. Continuing in this cycle, during the next time interval between times $t_c$ and $t_d$, only the left-eye image displays, and so on.

Relative to FIG. 4A, it should be noted that embodiments of a single projection apparatus could provide simultaneous left- and right images and avoid the need for page-flipping; however, this would require the expense and complexity of separate spatial light modulators, one for each eye, and supporting optical systems within each color path. Alternately, dual projectors could be used to provide simultaneous left- and right-eye images, but with concomitant cost, complexity, equipment setup, and alignment difficulties. Because of the disadvantages of both alternatives, the page-flipping sequence of FIG. 4A has been adopted as a favorable stereoscopic solution.

FIG. 4B shows the time interval $t_b-t_a$ from FIG. 4A and contrasts the conventional arrangement for such an interval with the timing sequence of the present invention. During time interval $t_b-t_a$, only the left-eye image displays with the conventional sequence, as shown again at the top of FIG. 4B. With the present invention, the same time interval $t_b-t_a$ can be considered as subdivided into as many as several hundred subintervals, denoted $t_{a1}, t_{a2} \ldots t_{ax}$ in FIG. 4B. During each subinterval, both the left-eye and right-eye images 132 are being formed simultaneously in the scanning sequence of the present invention. During any one subinterval, a line image 130*l* of the left-eye image having n pixels is projected and a line image 130*r* of the right-eye image is also projected. The complete left- or right-eye image 132 is not projected at any point in time during the interval from $t_a$ to $t_b$, but is formed by the rapid scanning of a number m of single image lines 130*l* and 130*r* respectively. As an idea of scale, a typical image 132 may be formed by scanning several hundred individual line images 130*l*, 130*r*. A high frame rate is used, sufficiently fast enough to preclude flicker. Typically, this means a frame rate on the order of about 60 Hz for both eye images, in this eye-simultaneous approach. At this frame rate, each subinterval for scanning a single line can be on the order of about 8 microseconds for a large display apparatus having 1080× 1920 pixels.

Figure 5:
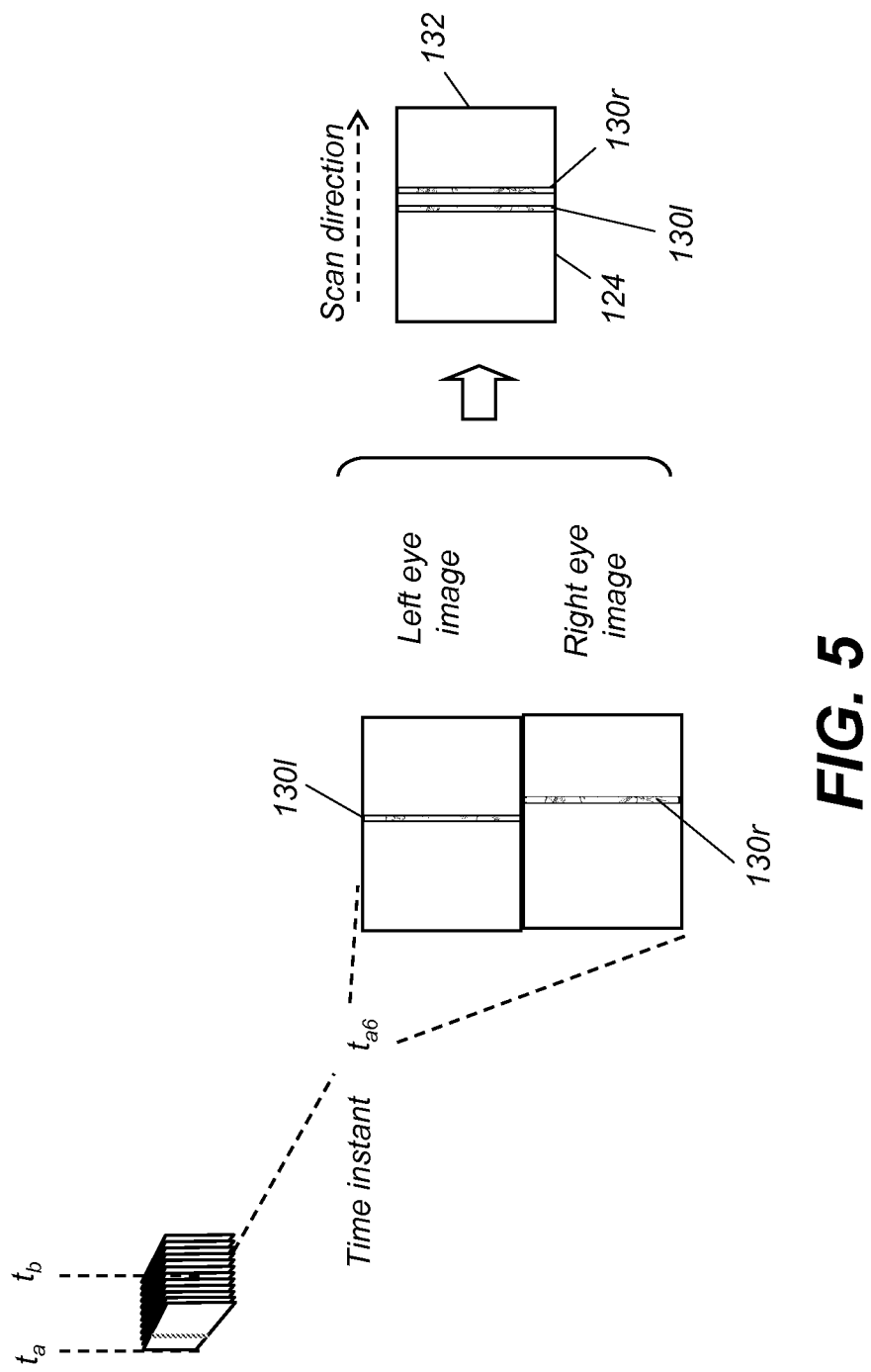
FIG. 5 is a plan view showing line scan formation of a two-dimensional image.

FIG. 5 shows a "snapshot" of the modulated light at one instant, given here as time $t_{a6}$. At this single instant, line images 130*l* and 130*r*, for left and right-eye images, are simultaneously directed toward the display screen. Relative to FIG. 5 and subsequent figures, it should be noted that there is some spatial separation shown between the specific left and right line images 130*l* and 130*r* that are projected at the same instant of time. This may be exaggerated in these figures; left and right line images 130*l* and 130*r* may be very closely positioned, such as within a few pixels of each other, or may even overlap. Using the embodiment of FIG. 2 and considering the red color channel, line image 130*l* is generated from one of the linear arrays 85*a* (FIG. 1A) of bilinear GEMS spatial light modulator chip 110*r* of light modulation module 104*r*; line image 130*r* is generated from the other of the linear arrays 85*b* of bilinear GEMS spatial light modulator chip 110*r* of light modulation module 104*r*. Other color channels work similarly. Again, line images 130*l* and 130*r* are shown with some separation distance between them in FIG. 5, although they may overlap.

Figure 6A:
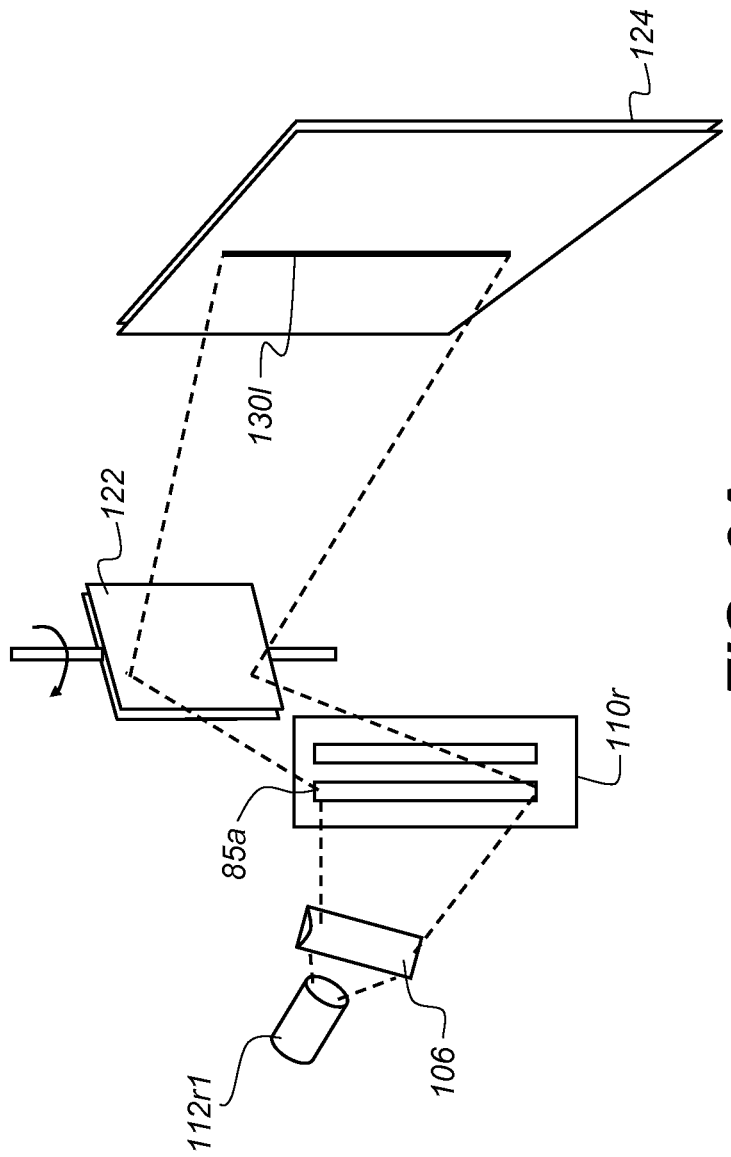
FIGS. 6A, 6B, and 6C are perspective views showing how various components in the optical path form left- and right-eye images by scanning both images, a single line at a time, from the same scanning element.
Figure 6B:
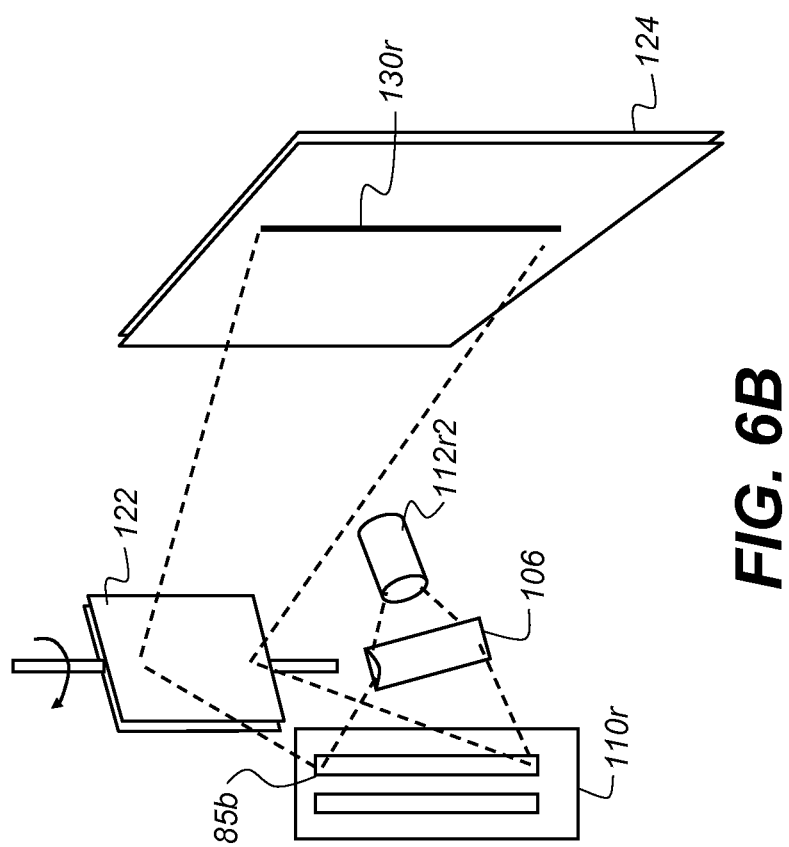
Figure 6C:
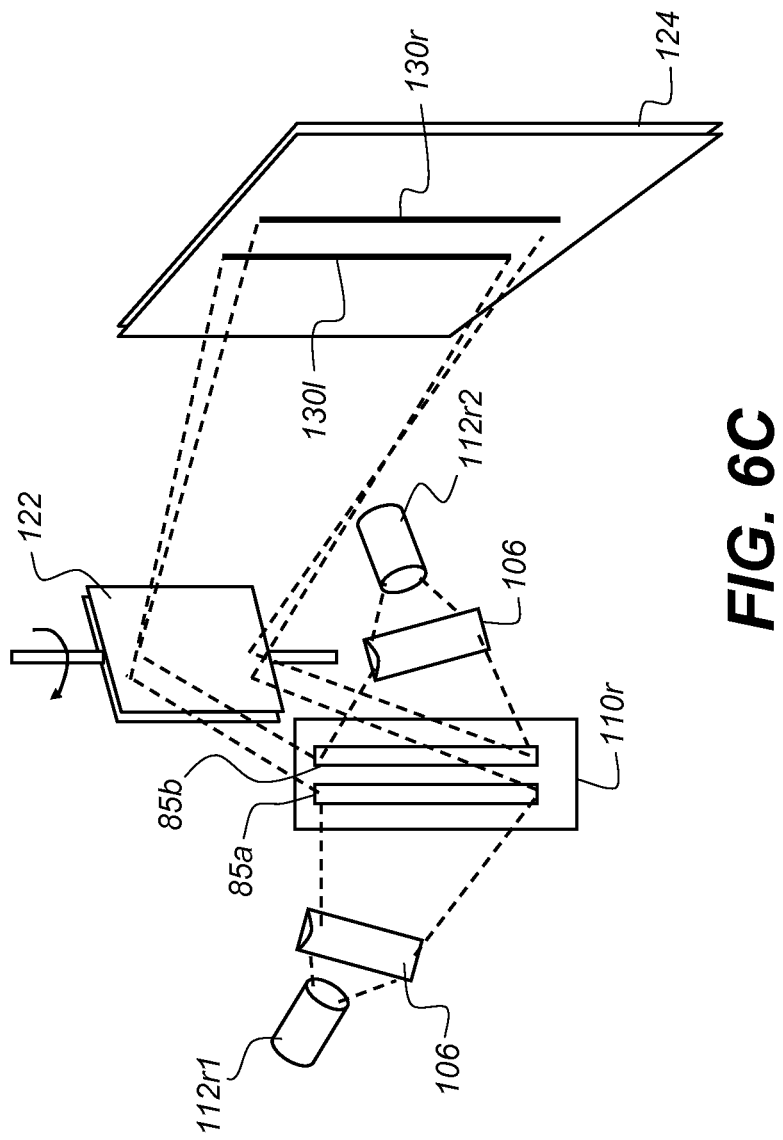

The sequence of FIGS. 6A, 6B, and 6C shows how left and right line images 130*l* and 130*r* are generated from a single bilinear GEMS spatial light modulator chip 110*r*. In these simplified views of the optical path, GEMS chip 110*r* is depicted as viewed from the rear; the active arrays 85*a* and 85*b* are seen as if from behind. Spatial and dimensional relationships are shown without respect to scale. Projection optics 120 and spatial filter 108 are not represented in the perspective views of FIGS. 6A-6C for clarity. In FIG. 6A, light from laser light source 112*r*1, shaped by illumination optics 106 is modulated at array 85*a* and directed to scanning element 122 through spatial filter 108 (shown in FIG. 2). Scanning element 122 then scans the modulated line of light for the left eye onto display surface 124 as line image 130*l*.

FIG. 6B shows the corresponding optical path for generation of line image 130*r* for the right-eye image. Light from laser light source 112*r*2 is shaped by illumination optics 106 and modulated at array 85*b*, then directed to the same scanning element 122 through spatial filter 108 (FIG. 2). FIG. 6C shows the combined optical paths for left and right line images 130*l* and 130*r*. Again, the separation distance between left and right line images 130*l* and 130*r* may be exaggerated as shown here for clarity of description; in practice, left and right line images 130*l* and 130*r* that are simultaneously directed to display surface 124 are more likely to be adjacent or overlapping.

It is instructive to note once again that the descriptions given earlier for FIGS. 4A through 6C are directed to a single color channel only. In a full-color display apparatus, this same timing and optical path arrangement applies for each of the three or more primary color channels.

As was noted with particular reference to the timing shown in FIGS. 4B, 5, and 6C, both left- and right-eye images can be simultaneously projected using the apparatus and method of the present invention, each image projected a single line at a time. Because of this, it is not necessary to compromise image resolution or light efficiency. Unlike the conventional timing arrangement described with reference to FIG. 4A, in which half of the light sources sit idle at any one time, the light sources of the present invention can be continuously energized during image formation, allowing increased light utilization and efficiency. Advantageously, due to the response speed of GEMS chips, motion images can be provided at a relatively fast refresh rate, minimizing flicker artifacts. The operating sequence shown in the embodiments of FIGS. 4B through 6C can be used with systems that employ either polarization separation or spectral separation for distinguishing left- from right-eye images.

The image data that is provided for modulating light at bilinear GEMS spatial modulator chip 110*r*, 110*g*, 110*b* is synchronized with the overall scan timing by which scanning element 122, rotating over its range of angles, redirects light toward display surface 124. The precise timing with which image data is provided to the GEMS devices or other bilinear light modulation devices is controlled by factors such as whether or not line images 130*l*, 130*r* are overlapping or are spatially offset, by the rate of rotation of scanning element 122, and by line image thickness, as well as by the refresh rate of the linear modulator hardware itself.

It can be appreciated that the present invention allows for any of a number of related embodiments for stereoscopic display. Other known techniques such as color-sequential illumination could be used in order to provide a stereoscopic display apparatus with an even simpler optical path. As one example, the embodiment of FIG. 7, a stereoscopic display apparatus can be designed using a single bilinear GEMS spatial light modulator chip 110 or similar bilinear spatial light modulator. In the configuration of a light modulation module 150 shown, illumination for lines of the left-eye image is provided to array 85*a* by an illumination beam 152*l* that provides each of the primary (RGB) colors in sequence, using the color-sequential timing arrangement that is well-known to those skilled in the electronic imaging arts. Similarly, for the right-eye image, an illumination beam 152*r* provides the primary colors for successive modulation by array 85*b*. This single-modulator configuration could be used with either polarization-based or spectral separation schemes for distinguishing left- and right-eye images, as described earlier. Illumination beams 152*l* and 152*r* would preferably utilize laser light sources of the different primary wavelengths, but could alternately use other solid-state light sources.

Figure 7:
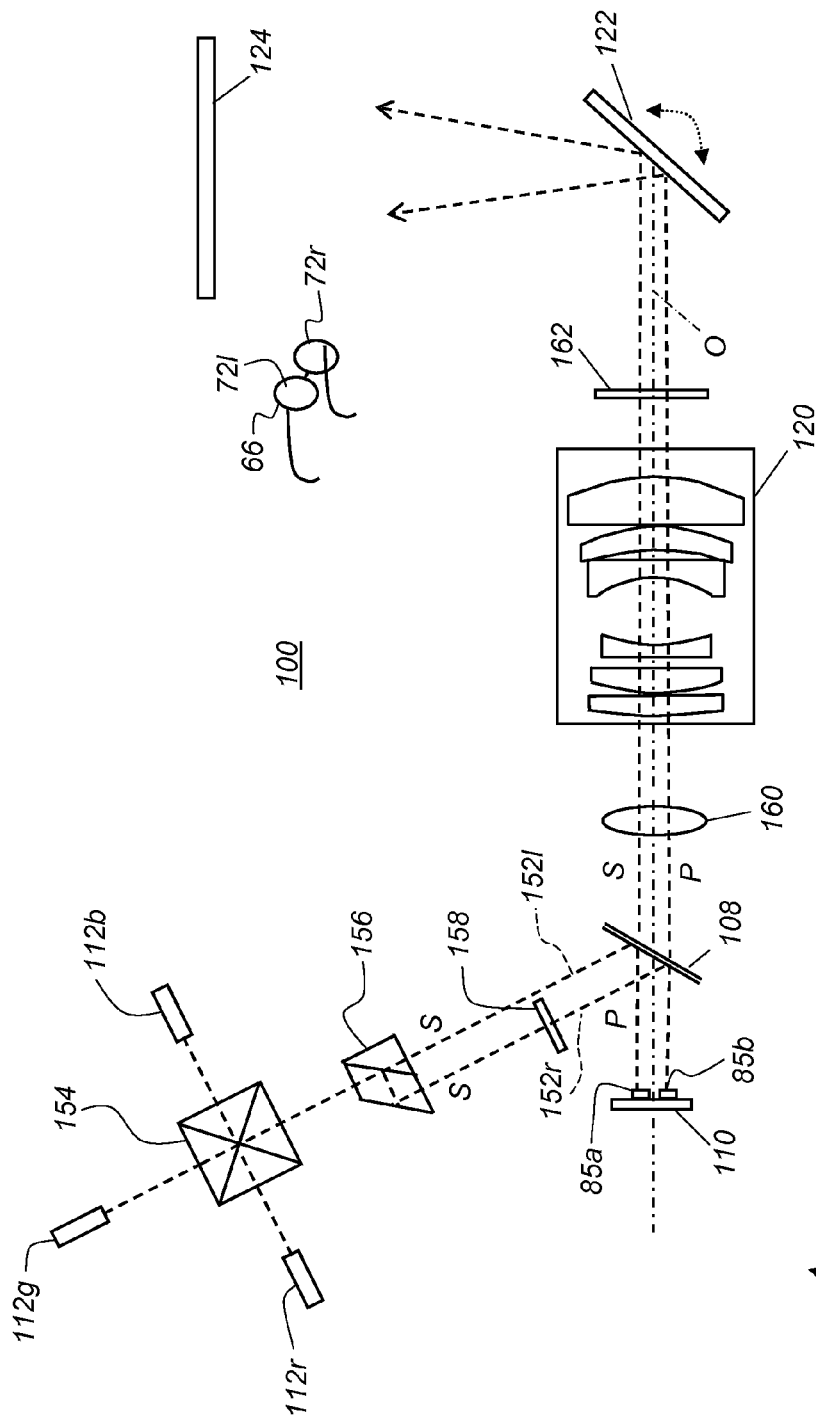
FIG. 7 is a schematic block diagram showing a stereoscopic display apparatus using color-sequential illumination in an alternate embodiment of the present invention.

In the embodiment of FIG. 7, light modulation module 150 generates illumination beams 152*l* and 152*r* for a sequential color illumination arrangement using light sources 112*r*, 112*g*, and 112*b*. Light sources 112*r*, 112*g*, and 112*b* are polarized, such as polarized lasers, for example. Each light source 112*r*, 112*g*, and 112*b* is directed to a combiner 154, such as an X-cube, that directs its illumination along the same path to a beamsplitter 156, shown as a lateral displacement beamsplitter in this figure. Polarization states are shown using conventional S and P notation. Beamsplitter 156 separates the illumination into two paths, both having the same polarization state (S, as shown). A half-wave plate 158 rotates the polarization along one path (the right-eye image path in this figure). The modulated light is then directed through spatial filter 108 and to projection optics 120 through one or more lenses 160. For embodiments that use circular polarization, a quarter-wave plate 162 may be provided in the path of modulated light.

With the FIG. 7 arrangement, red, green, and blue primary light is successively directed to bilinear GEMS spatial light modulator chip 110 for modulation for each eye. While this configuration may lack the efficiency and brightness of other embodiments described herein, it does provide the capability for stereoscopic display using a single bilinear GEMS chip.

Trilinear Embodiment

Figure 8:
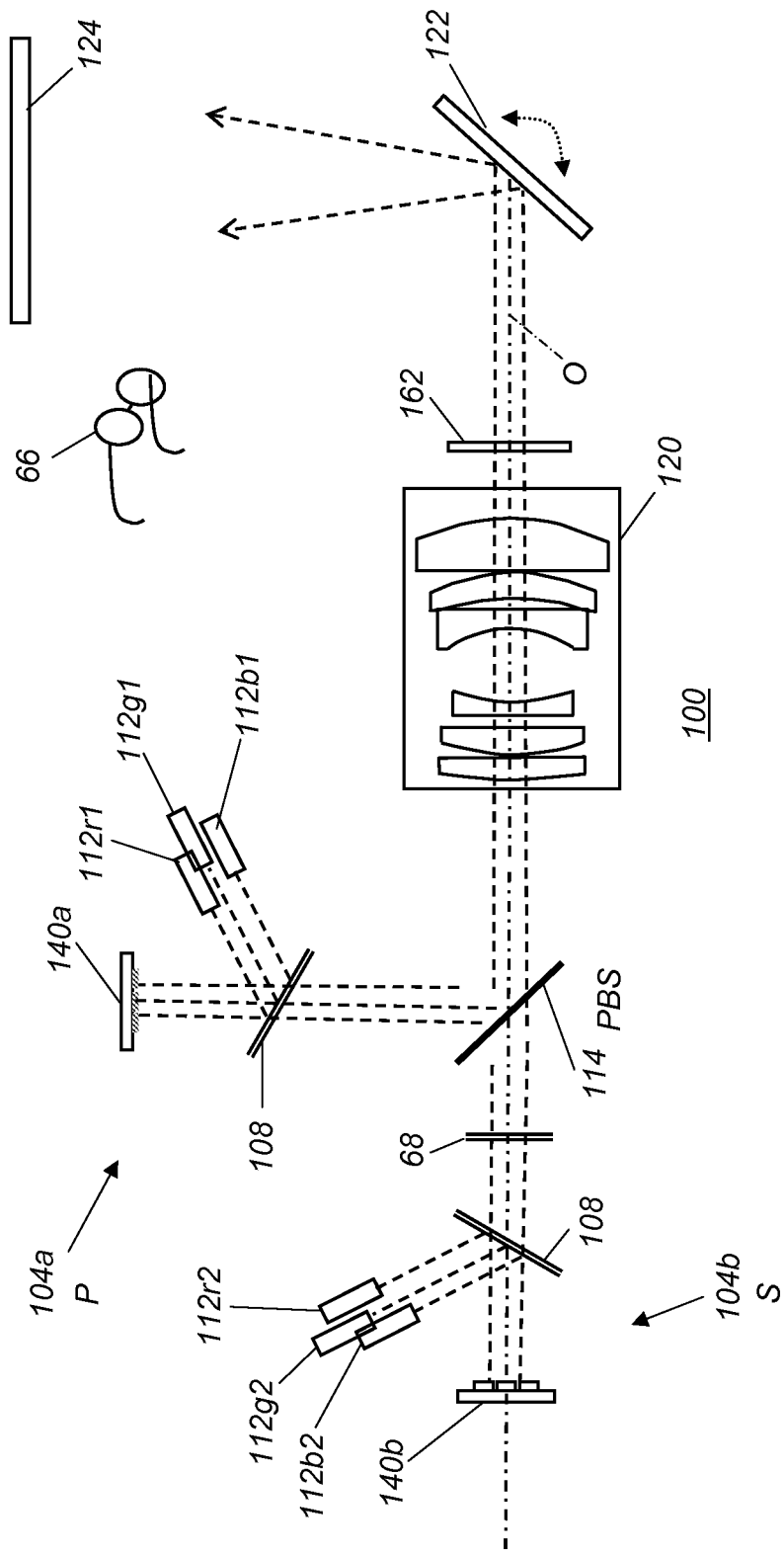
FIG. 8 is a schematic diagram showing an embodiment that uses trilinear GEMS chips to provide stereoscopic projection images.

Referring to FIG. 8, there is shown another embodiment of display apparatus 100 using two light modulation modules 104a and 104b, each with a corresponding trilinear GEMS spatial light modulator chip 140a and 140b, respectively. In the embodiment shown, polarization is used to provide separate left- and right-eye images. Using conventional notation, light modulation module 104a uses illumination of one polarization (P-polarized light in this example); light modulation module 104b uses light of the orthogonal polarization (S-polarized light in this example). Laser light from devices such as solid-state laser arrays is typically highly polarized. In the embodiment shown, a half-wave plate 68 is provided to change the polarization of modulated light from one of the light modulators, here 104b. As would be apparent to one skilled in the electronic imaging art, an alternate embodiment could use two quarter-wave plates in place of the half-wave plate 68. One quarter-wave plate would be positioned in the path of modulated light from light modulation module 104a, the other, differently oriented, in the path of modulated light from light modulation module 104b.

Modulated light is directed onto optical axis O by a polarization beamsplitter (PBS) 114, projected, and scanned toward display surface 124 as with the FIGS. 2 and 7 embodiments. For embodiments that use circular polarization, quarter-wave plate 162 may be provided in the path of modulated light.

A spectral separation embodiment could also be provided using two trilinear GEMS spatial light modulator chips 140a and 140b with suitable spectral separation between light sources of primary colors. For such an embodiment, half-wave plate 68 would not be used and PBS 114 would be replaced by a dichroic combiner. Color gamut considerations are described subsequently.

It is known to those skilled in the electronic color projection arts that the green color channel is of particular importance for luminance, and therefore perceived image resolution, and that red and blue color channels are of less significance for this purpose. Further embodiments of the present invention can take advantage of this behavior by providing modulation of different color channels at different resolutions. Thus, for example, the green color channel of light modulation module 104g would be at full resolution. Red and blue color channels provided by light modulation modules 104r and 104b would each be at half the resolution of the green color channel along the array axis and, optionally, also along the scan axis.

Reduced resolution arrangements can be advantaged in a number of ways. Response timing requirements for multi-linear GEMS spatial light modulator chip 110 can be relaxed. In addition, fabrication requirements can be reduced, allowing additional space for routing of control signal traces on the multi-linear GEMS substrate, which can be constrained with full-resolution bilinear designs.

Color Gamut Considerations

Figure 9:
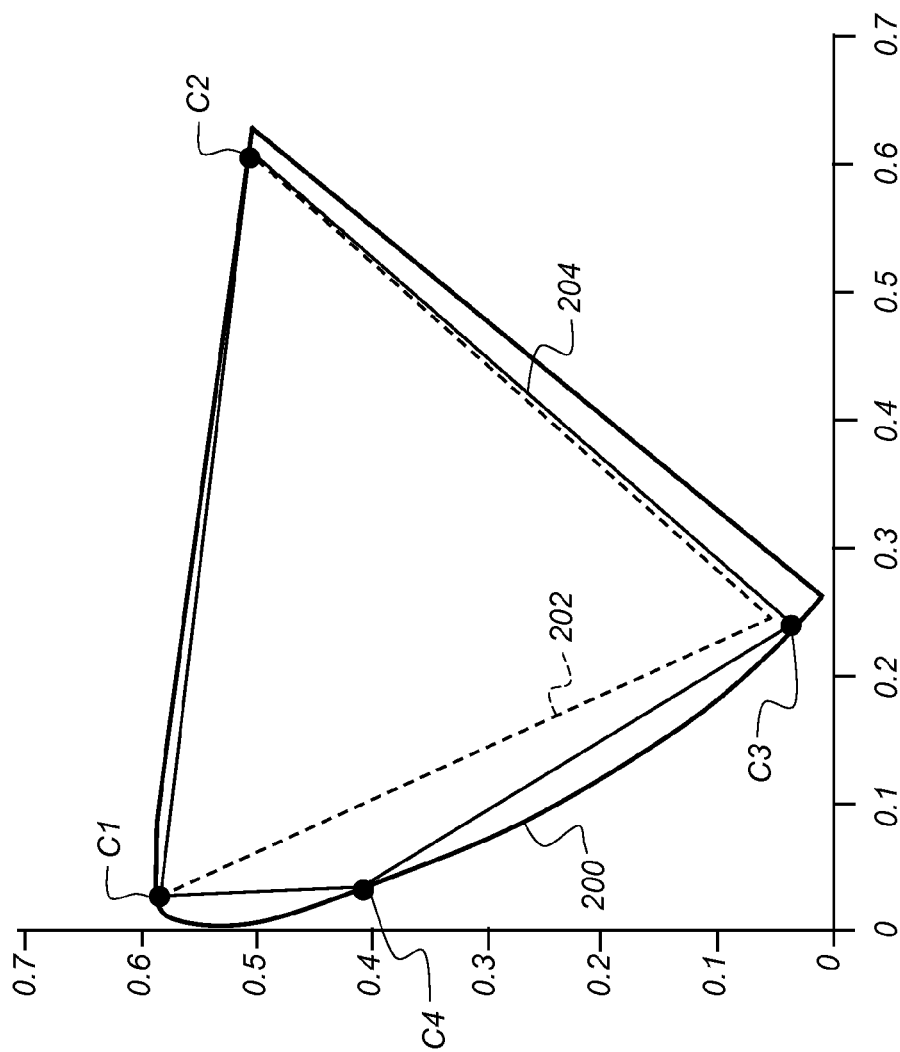
FIG. 9 is a graph showing color space mapping for three- and four-color embodiments.

There is considerable interest in increasing the range or gamut of colors that can be displayed in order to provide a more realistic, more vivid image than is possible with the gamut limitations of film dyes or phosphors. The familiar tristimulus CIE color model developed by Commission International de l'Eclairage (International Commission on Illumination) shows the color space perceived by a standard human observer. FIG. 9 shows the CIE color model in the u', v' space, which represents a visible gamut 200 as a familiar "horseshoe" curve. Within visible gamut 200, the gamut of a conventional display device can be represented by a three-sided device gamut 202, such as standard Society of Motion Picture and Television Engineers (SMPTE) phosphors, for example. As is well known in the color projection arts, it is desirable for a display device to provide as much of visible gamut 200 as possible in order to faithfully represent the actual color of an image or to provide a wide range of colors for graphics or computer-generated imagery, for example.

Referring to FIG. 9, pure, saturated spectral colors are mapped to the "horseshoe" shaped periphery of visible gamut 200. The component colors of a display, typically primary colors red, green, and blue (RGB), define the vertices of the polygon for a color gamut, thereby defining the shape and limits of device gamut 202, shown in dashed line for better visibility. Ideally, these component colors are as close to the periphery of visible gamut 200 as possible. The interior of the "horseshoe" then contains all mappings of mixtures of colors, including mixtures of pure colors with white, such as spectral red with added white, which becomes pink, for example.

One simple strategy to increase the size of device gamut 202 is to use light sources that are spectrally pure, or have at least a good degree of spectral purity. Lasers, due to their inherent spectral purity, are particularly advantaged for maximizing device gamut 202. A second strategy for expanding color gamut is to move from the conventional triangular area of device gamut 202, as shown in FIG. 8, to a polygonal area, shown as an expanded device gamut 204. In order to do this, one or more additional primary spectral colors must be added. Primary spectral colors C1, C2, C3, and C4 are represented as dots that form the vertices of expanded device gamut 204. The needed methods for combining additional colors onto the same optical path are known in the electronic imaging arts.

Lasers are shown as the light sources for display apparatus 100 in embodiments of the present invention. Lasers can be continuously energized and are advantaged because of their relative spectral purity and spatial coherence. Lasers are particularly advantaged where spectral separation is used to distinguish left- from right-eye images. Laser arrays of particular interest for projection applications are various types of vertical cavity surface-emitting laser (VCSEL) arrays, including vertical extended cavity surface-emitting laser (VECSEL) and Novalux Extended Cavity Surface-Emitting Laser (NECSEL) devices from Novalux, Sunnyvale, Calif. However, other types of light sources could be used for providing linear illumination to the GEMS spatial light modulator chip. Methods for providing, from a single light source, light of two orthogonal polarization states are well known to those skilled in the electronic imaging arts.

Figure 10:
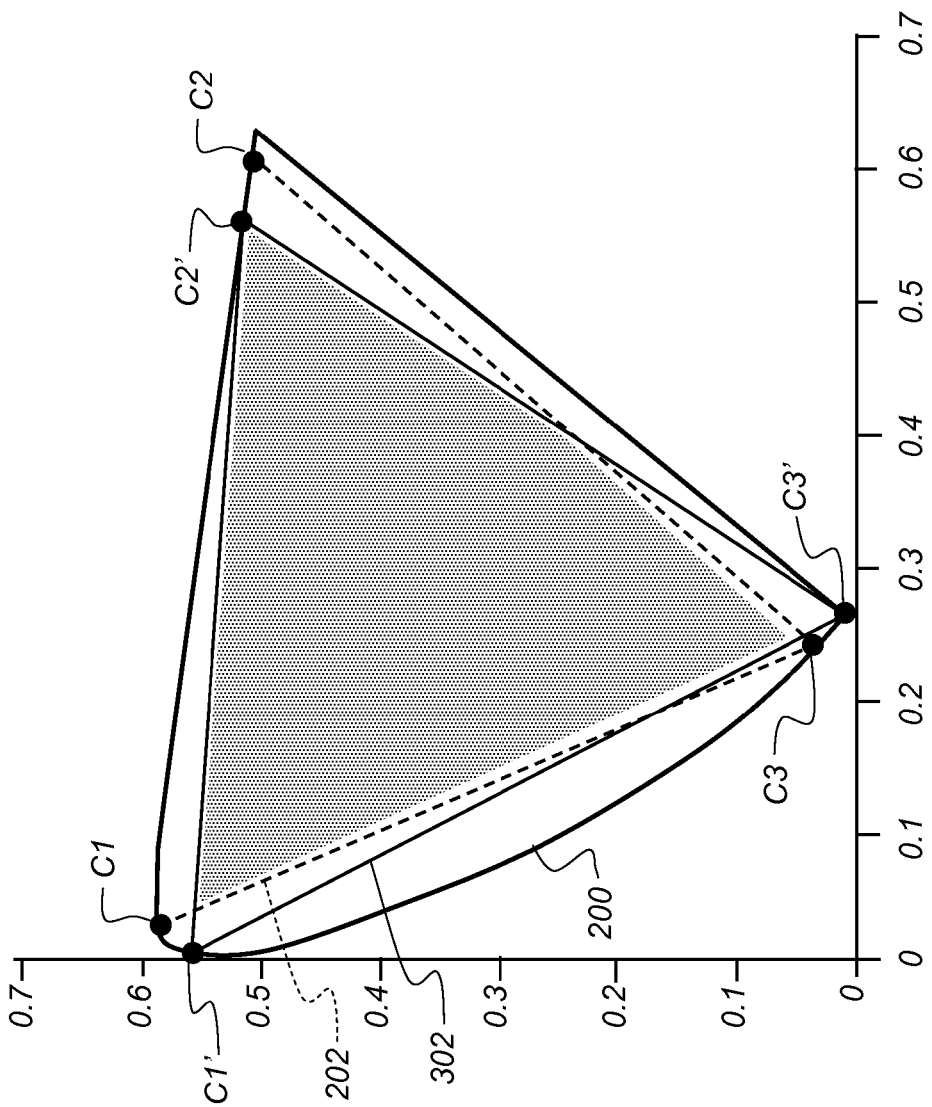
FIG. 10 is a graph showing color mapping for stereoscopic imaging apparatus using spectral separation.

There can be additional color gamut considerations for stereoscopic embodiments that utilize spectral separation for left- and right-eye images. With spectral separation schemes, two sets of primary colors are employed, a first set {C1, C2, C3} for the left-eye image, a second set {C1', C2', C3'} for the right-eye image. As shown in FIG. 10, the first set of primary colors {C1, C2, C3} defines device gamut 202 (dashed lines). The second set of primary colors {C1', C2', C3'} defines a device gamut 302 (solid lines). Device gamuts 202 and 302 intersect over a significant portion of visible gamut 200; however, there are portions of each that are distinct. In practice, the usable gamut for stereoscopic viewing is the intersection, highlighted graphically in FIG. 10. (Using colors outside this intersection portion proves unpleasant for the viewer.) Thus, there is motivation for selecting similar colors (such as C1 and C1') that are close in wavelength, so that the intersection area is maximized. On the other hand, crosstalk between similar colors, a result of imperfect filter behavior, should be minimized. Thus, it can be appreciated that selecting the two primary color sets {C1, C2, C3} for the left-eye image and {C1', C2', C3'} for the right-eye image requires achieving a balance between optimizing color gamut and minimizing color channel crosstalk.

It can be appreciated that a number of additional stereoscopic configurations using multi-linear electromechanical arrays are within the scope of the present invention. Additional primary colors can be added using combinations with additional bilinear or trilinear arrays.

The stereoscopic embodiments shown in FIGS. 2, 7, and 8 can switch modes, operating either in three-dimensional stereoscopic mode or in two-dimensional imaging mode. With respect to FIG. 2, for example, it can be advantageous to use the same image content for both left- and right-eye images, so that polarization or spectral differences are not visible to the viewer. Then, where stereoscopic image content is available, the imaging mode can be switched accordingly. Glasses 66 or other type of decoding device could then be used only for the stereoscopic imaging portion.

Dual Viewer Embodiments

Stereoscopic display apparatus 100 can alternately be used for dual-viewer projection. The subject of considerable interest for gaming and simulation applications, dual-viewer operation is a variant of stereoscopic operation, provided using stereoscopic projection apparatus and techniques, with only a slight change at the viewer end. For dual-viewer mode, the change is straightforward: what has been termed the "left-eye image" is now intended for a first viewer and what has been termed the "right eye image" is intended for a second viewer.

Figure 11:
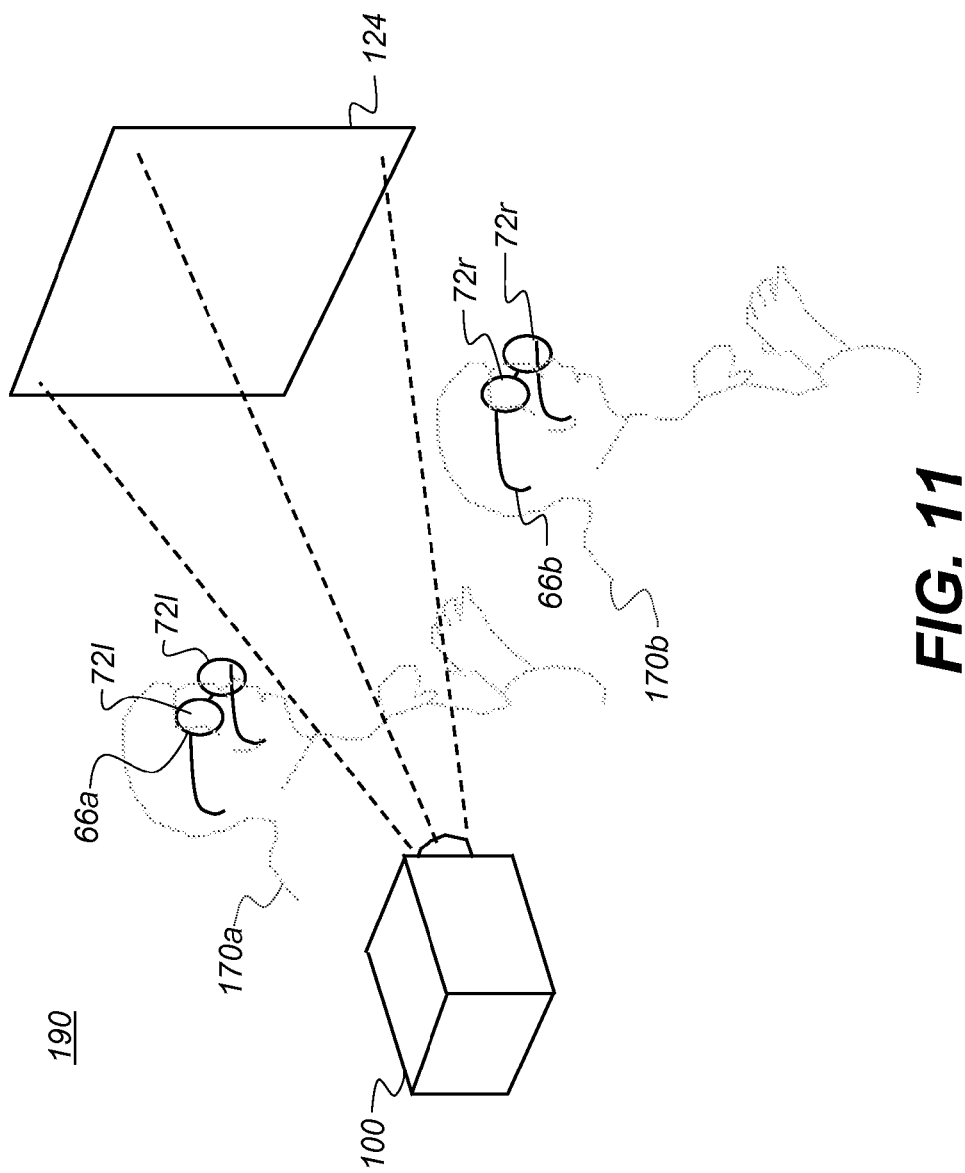
FIG. 11 is a block diagram showing a display apparatus in a dual viewer application.

FIG. 11 shows a dual-viewer display system 190 in one embodiment. Stereoscopic display apparatus 100 operates in the same manner described earlier with reference to the embodiments shown in FIGS. 2, 7, and 8, providing left- and right-eye images. A first viewer 170a has glasses 66a or other type of decoding device with distinction elements 72l installed in front of both eyes and thus views only the left-eye image. Similarly, a second viewer 170b views only the right eye image, using glasses 66b with distinction elements 72r for both eyes. As can be seen from FIG. 11, the only modification needed to the stereoscopic display system for dual viewing is substituting glasses 66a and 66b (or other suitable decoding devices) for glasses 66 shown in FIGS. 2, 7, and 8. This arrangement allows two different views, so that one or more viewers 170a can see the left viewer image (corresponding to the left-eye image in the example embodiment of FIG. 11) and one or more viewers 170b can see the right viewer image (corresponding to the right-eye image in the example embodiment of FIG. 11).

Of particular interest for consumer display applications, dual-viewer operation allows two viewers to simultaneously enjoy different programs or two competing gamers to each have full-screen separate perspectives of the same game in which they are each engaged. Multiple viewers could be provided with glasses 66a and 66b for dual-viewer display.

The invention has been described in detail with particular reference to certain preferred embodiments thereof, but it will be understood that variations and modifications can be effected within the scope of the invention as described above and as noted in the appended claims by a person of ordinary skill in the art without departing from the scope of the invention. For example, although GEMS devices are used in the example embodiments described herein, the use of other types of linear light modulators can be envisioned. Grating light valve (GLV) components could alternately be used for forming left- and right-eye line images in some embodiments. The control logic circuitry that synchronizes the timing of image modulation and positioning of scanner element 122 is not shown in FIGS. 2, 7, and 8, but is familiar to those skilled in the electronic imaging arts. Also, it is well known to those skilled in the art that polarization cleanup components can be added to the optical system to maintain left eye and right eye image separation and average light levels. These polarization cleanup components can include clean up polarizers or compensators.

Thus, what is provided is an apparatus and method for using multi-linear electromechanical grating devices for stereoscopic color projection.

PARTS LIST

40 GEMS chip
60 GEMS chip
62 substrate
64 combiner
66 glasses
66a glasses
66b glasses
68 half-wave plate
72l right distinction elements
72r left distinction elements
85a array
85b array
88 linear illumination
90 stereoscopic frame
100 display apparatus
104a light modulation module
104r light modulation module
104g light modulation module
104b light modulation module
106 illumination optics
108 spatial filter
110 bilinear GEMS spatial light modulator chip
110r bilinear GEMS spatial light modulator chip
110g bilinear GEMS spatial light modulator chip
110b bilinear GEMS spatial light modulator chip
112r light source
112g light source
112b light source
112r1 laser light source
112r2 laser light source
112g1 laser light source
112g2 laser light source
112b1 laser light source
112b2 laser light source
114 polarization beamsplitter
115 beamsplitter
120 projection optics
122 scanning element
124 display surface
130l line image
130r line image
132 image
140a trilinear GEMS spatial light modulator chip
140b trilinear GEMS spatial light modulator chip
150 light modulation module
152l illumination beam 152r illumination beam
154 combiner
156 beamsplitter
158 half-wave plate
160 lens
162 quarter-wave plate
170a viewer
170b viewer
185r array
185g array
185b array
190 dual-viewer display system
200 visible gamut
202 device gamut
204 expanded device gamut
302 device gamut
A area
C1 primary color
C2 primary color
C3 primary color
C4 primary color
C1' primary color
C2' primary color
C3' primary color
O optical axis
R section
G section
B section
I section
II section

The invention claimed is:

1. A method for forming a stereoscopic image that comprises a left-eye image and a right-eye image, the method comprising the repeated steps of:
  a) simultaneously forming a single line of the left-eye image extending in a first direction using a first linear light modulator;
  a single line of the right-eye image extending in the first direction using a second linear light modulator;
  b) simultaneously directing the left-eye and right-eye single lines toward a surface of a scanning element, so that the single line of the left eye image is spatially separated from the single line of the right eye image on the surface of the scanning element in a second direction orthogonal to the first direction and spatially separated left-eye and right-eye single lines are reflected from the surface of the scanning element;
  c) simultaneously directing the spatially separated left-eye and right-eye single lines reflected from the surface of the scanning element to a display surface;
  d) rotating the scanning element;
  e) temporally successively repeating steps a), b), c) and d) to scan the temporally successive left-eye single lines of the left-eye image so that each successive left-eye single line extends in the first direction and is offset from the previous left-eye single line in the second direction on the display surface and to scan the temporally successive right-eye single lines of the right-eye image so that each successive right-eye single line extends in the first direction and is offset from the previous right-eye single line in the second direction on the display surface; and
  f) wherein the left eye image and the right eye image are differently encoded so that left eye image is viewed with a left eye decoder and the and right eye image is viewed with a right eye decoder different from the left eye decoder.

2. The method of claim 1 wherein the first and second linear light modulators are formed on the same substrate.

3. The method of claim 1 wherein the single-line images of the left-eye image are at a first wavelength and the single-line images of the right-eye image are at a second wavelength and wherein the first wavelength is within 40 nm of the second wavelength.

4. The method of claim 1 wherein directing a single-line image of the left-eye image comprises directing said single-line image through at least one lens.

5. The method of claim 1 wherein the first linear light modulator is a grating electromechanical system device.

6. The method of claim 1 wherein
  there is spatial separation between the single-line images of the left and right-eye images on the order of a few pixels.

7. A method for forming a polychromatic stereoscopic image on a display surface that comprises a polychromatic left-eye image and a polychromatic right-eye image, each polychromatic image further comprising at least a first color channel, a second color channel, and a third color channel, the method comprising the repeated steps of:
  directing successive single-line images of the left-eye image extending in a first direction toward a surface of a scanning element while simultaneously directing successive single-line images of the right-eye image extending in the first direction toward the surface of the scanning element;
  wherein the single-line images of the left eye image is spatially separated from the single-line images of the right eye image;
  wherein the left eye image and the right eye image are differently encoded so that left eye image is viewed with a left eye decoder and the and right eye image is viewed with a right eye decoder different from the left eye decoder; and
  moving the scanning element to simultaneously scan the single-line images of the left-eye image and the single-line images of the right-eye image over a display surface in a direction orthogonal to the first direction.

8. The method of claim 7 wherein, for each color channel, the single-line image of the left-eye image is at a first wavelength and the single-line image of the right-eye image is at a second wavelength and wherein the first wavelength is within 40 nm of the second wavelength.

9. The method of claim 7 wherein a solid-state light source provides illumination for forming the left-eye image and a second solid-state light source provides illumination for forming the right-eye image in the first color channel.

10. The method of claim 7 wherein directing a single-line images of the left-eye image comprises forming the single-line images of the left-eye image using a multi-linear grating electromechanical system device.

11. The method of claim 7 wherein the scanning element is taken from the group consisting of a mirror and a polygon.

12. The method of claim 7 wherein
  there is spatial separation between the single-line images of the polychromatic left and right-eye images on the order of a few pixels.

13. A method for forming an n-by-m pixel stereoscopic image onto a display surface that comprises an n-by-m pixel left-eye image and an n-by-m pixel right-eye image, the method comprising the repeated steps of:
  directing an n-pixel single-line image of the left-eye image extending in a first direction toward a surface of a scanning element while simultaneously directing an n-pixel single-line image of the right-eye image extending in the first direction toward the surface of the scanning element;

wherein the n-pixel single-line image of the left eye image is spatially separated from the n-pixel single-line image of the right eye image;

forming m additional single-line images extending in the first direction for each eye;

wherein the n-by-m pixel left eye image and the n-by-m pixel right eye image are differently encoded so that the n-by-m pixel left eye image is viewed with a left eye decoder and the and the n-by-m pixel right eye image is viewed with a right eye decoder different from the left eye decoder; and moving the scanning element to simultaneously scan the n-pixel single-line image of the left-eye image and the n-pixel single-line image of the right-eye image over the display surface in a direction orthogonal to the first direction.

14. A method for forming an n-by-m pixel polychromatic stereoscopic image onto a display surface that comprises an n-by-m pixel polychromatic left-eye image and an n-by-m pixel polychromatic right-eye image, each polychromatic image further comprising at least a first color channel, a second color channel, and a third color channel, the method comprising the repeated steps of:

directing an n-pixel single-line image of each color channel of the left-eye polychromatic image extending in a first direction toward a surface of a scanning element while directing an n-pixel single-line image of each color channel the polychromatic right-eye image extending in the first direction toward the surface of the scanning element;

wherein the n-pixel single-line image of the left eye image is spatially separated from the n-pixel single-line image of the right eye image;

forming m additional single-line images extending in the first direction for each eye;

wherein the n-by-m pixel left eye image and the n-by-m pixel right eye image are differently encoded so that the n-by-m pixel left eye image is viewed with a left eye decoder and the and the n-by-m pixel right eye image is viewed with a right eye decoder different from the left eye decoder; and moving the scanning element to simultaneously scan the n-pixel single-line images of each color channel of the polychromatic left-eye image and the n-pixel single-line images of each color channel of the polychromatic right-eye image over the display surface in a direction orthogonal to the first direction.

* * * * *